Jan. 29, 1952 D. B. COX 2,583,547
CONTROL INSTRUMENT
Filed March 26, 1947 2 SHEETS—SHEET 1

INVENTOR.
DUNCAN B. COX
BY Duell & Kane
ATTORNEYS.

Jan. 29, 1952     D. B. COX     2,583,547
CONTROL INSTRUMENT
Filed March 26, 1947     2 SHEETS—SHEET 2
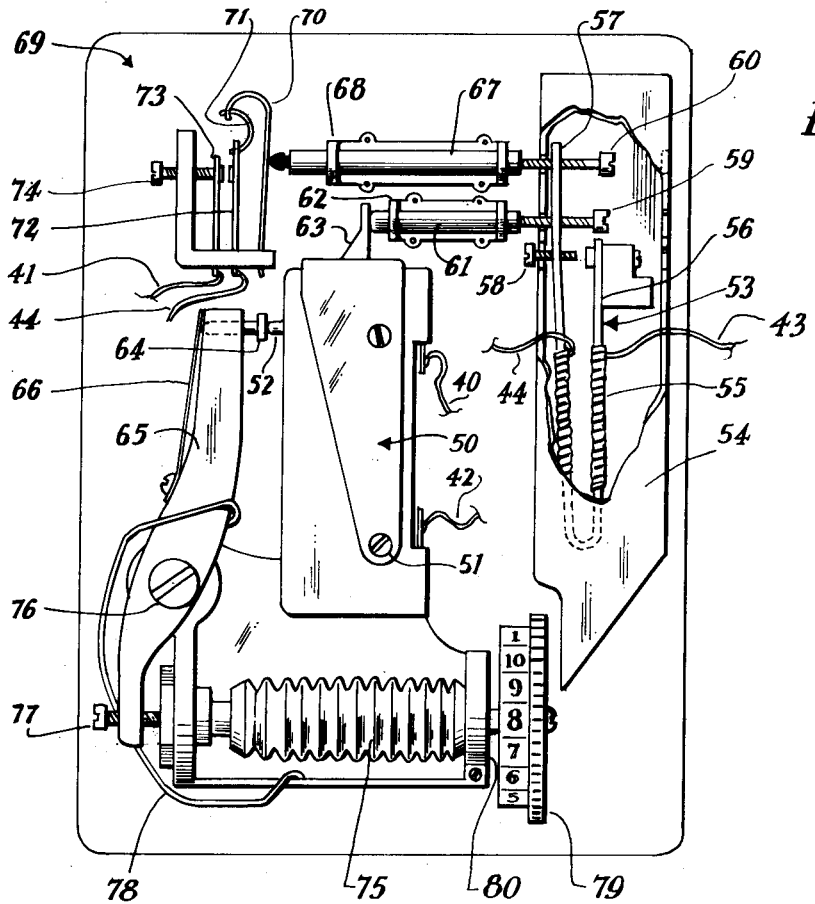
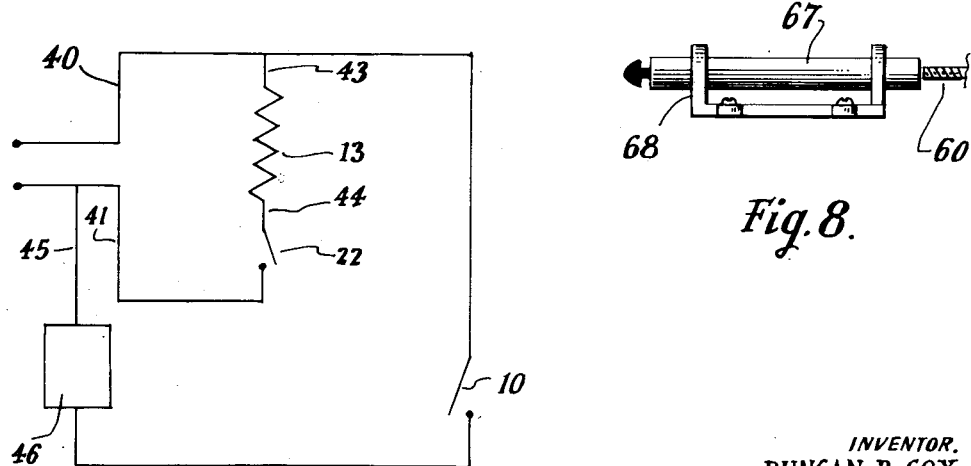
INVENTOR.
DUNCAN B. COX
By Duell & Kane
ATTORNEYS.

Patented Jan. 29, 1952

2,583,547

UNITED STATES PATENT OFFICE 2,583,547

CONTROL INSTRUMENT

Duncan B. Cox, Woodbury, N. Y.

Application March 26, 1947, Serial No. 737,281

8 Claims. (Cl. 172—126)

This invention relates to an improved control instrument.

It is an object of the invention to provide an improved and simplified control of the throttling type. As an example, a control instrument embodying my invention may be used to control conventional space heating systems such as heating systems for houses and buildings. When so used the space can be maintained at the desired predetermined uniform temperature without the substantial fluctuations above and below the desired predetermined temperature inherent in the operation of the conventional thermostatic control instrument.

A further object is the provision of a control instrument wherein throttling control for a system is provided within a range of operating conditions and the system is cut off or caused to operate full on above or below the range and which may be readily adjusted to vary both the extent and the average value of the range in which the throttling control is provided.

Another object is the provision of an improved control instrument of the above character which is of compact, inexpensive but nevertheless sturdy construction and which can be readily installed, adjusted and serviced.

A further object is the provision of an improved control unit for a radiant heating system of the panel type wherein the radiant heat output of the panels varies generally inversely with the temperature of the air, this relationship being predetermined so as to give a substantially uniform degree of comfort to the occupants regardless of variations in air temperature.

In the accompanying drawings:

Fig. 6 is a circuit diagram showing the electrical circuits for the instrument shown in Fig. 1;

Fig. 7 is an elevational view with portions broken away of a further modified form of control instrument embodying my invention; and Fig. 8 is a detailed view of an operating rod or plunger used in the upper portion of the switch shown in Fig. 7.

My control instrument comprises generally a valve or switch for controlling a system, cycling means for causing the cyclical operation of the valve or switch within a predetermined range of operating conditions, and optionally a device for varying the cyclical operation in response to fluctuations in operating conditions in the system.

Referring now to the first form of my invention, the control instrument is shown as mounted upon a suitable support. The control device which takes the form of a switch or valve for controlling the system is indicated by the numeral 10 and consists of one conventional type of snap action switch although other types of switches or valves may also be employed. This switch is operated by means of a small reciprocal pin or plunger 11 protruding from one face thereof. The illustrated switch is closed when the pin 11 projects outwardly and it is open when the pin is pressed inwardly.

Figure 1:
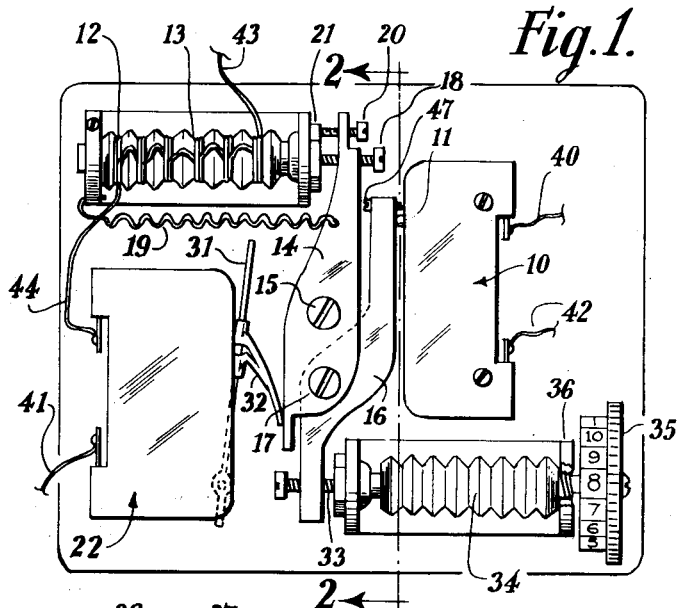
Fig. 1 is an elevational view of a control instrument embodying my invention.

The switch 10 is caused to operate cyclically within a predetermined range of operating conditions by improved cycling means, which includes a conventional liquid-filled, bellows-type thermostatic element 12 which is fixedly mounted at one end, i. e., the end illustrated at the left side of Fig. 1, with the result that the opposite end shifts back and forth in response to changes in temperature. The thermostatic element is alternately heated and cooled and thereby caused to shift in a predetermined manner by the energizing and de-energizing of an electric heating element 13 which is disposed around the bellows.

The movement of the thermostatic element is utilized to control the circuit of the heating element and also to cause the operation of switch 10. This is accomplished through suitable means such as lever 14 pivoted at 15 to the support of the instrument and lever 16 pivoted at 17 to lever 14. The shiftable end of the thermostatic element 12 is engageable with adjusting screw 18 carried adjacent to the upper end of lever 14, so that expansion of the element is transmitted to lever 14, causing it to pivot in a clockwise direction. Upon the contraction of the thermostatic element, the lever is returned in a counter-clockwise direction by means of spring 19 connected at one end to the lever and at its opposite end to a fixed support for the bellows. The return movement of the lever may be limited by an adjustable screw 20 engageable with a fixed support or bracket 21.

The movement of lever 14 is utilized to control the operation of heating element 13 through the medium of a snap-action device which permits a limited reciprocation or movement of the lever between the two points of operation of the snap-action device. In the illustrated embodiment of my invention the snap-action device is incorporated directly in a snap-action switch 22. The snap-action switch is one of conventional type and is illustrated in detail in Fig. 3. Thus, it consists of an actuating blade 24 and a contact blade 25 fixedly mounted at their lower ends and inter-connected at their upper ends by means of a bowed rolling spring 26. The contact blade 25 is somewhat longer than the actuating blade 24 and carries a contact 27 at its upper end. The contact 27 is shiftable between fixed contact point 28 and stop 29.

The device is operated by means of the operating pin of plunger 30 projecting from the casing of the switch at its outer end and engageable with the actuating blade 24 at its inner end. When the pin is pressed inwardly it causes the flexing of blade 24 which in turn displaces the rolling spring 26. Finally when the pin is shifted inwardly sufficiently to cause the force in blade 24 to overcome the resistance of the rolling spring, blade 24 flexes past center and contact 27 is caused to shift from fixed contact 28 to stop 29 with snap-action. When pin 30 is released so that it can shift outwardly the action is reversed and the blade 24 overcomes the resistance of the rolling spring and shifts past center on its return movement. The result then is that contact 27 shifts with snap-action from stop 29 to fixed contact 28. This snap action not only provides for a quick make and break of the contacts, but also permits the pin 30 to reciprocate back and forth through a limited path of movement between the two points of operation of the switch.

Figure 2:
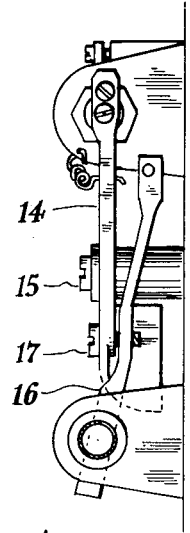
Fig. 2 is a view in the direction of the arrows on the line 2—2 of Fig. 1.
Figure 3:
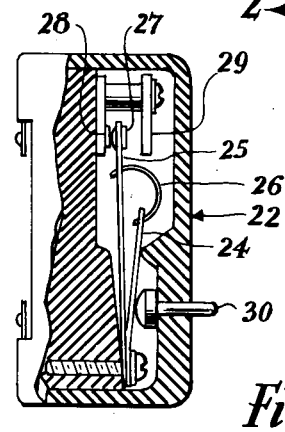
Fig. 3 is a detailed view of one type of snap action switch which may be employed in the control instrument with portions of the casing removed to reveal the construction thereof.
Figure 4:
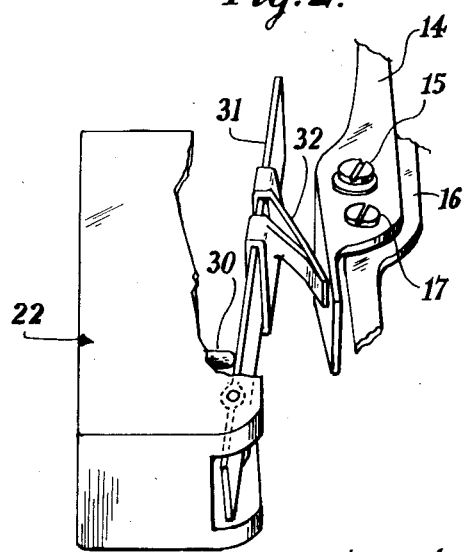
Fig. 4 is a detailed view indicating the interrelationship of the links and levers for operating the output control switch.
Figure 5:
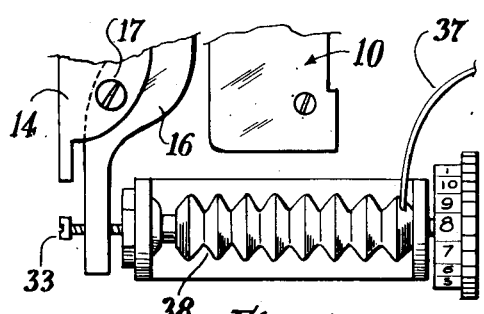
Fig. 5 is a detailed view of the lower portion of a modified form of control instrument in which a pressure responsive device is substituted for the thermostatic element.

The switch 22 is connected so as to control the heating element of the unit 13 and in the illustrated arrangement the switch is closed and the heating element is energized when operating pin 30 is in its outwardly projecting position, as shown in Figs. 1, 2 and 3. The reciprocation of the pin and the operation of the switch is caused by means of lever 31 pivoted to the switch casing so as to be engageable with the pin 30 and having a sliding adjusting arm 32 mounted thereon which engages against the lower face of lever 14.

The cycling operation of the thermostatic element 12 is as follows—when the device is in the position shown in Figs. 1 and 2, switch 22 is closed with the result that heating element 13 is energized. The heating element is in heat transfer relation with the thermostatic device with the result that the thermostatic device is caused to expand, which in turn causes lever 14 to pivot in a clockwise direction. The lower end of lever 14 as viewed in Fig. 1 accordingly shifts to the left causing lever 31 likewise to shift to the left pressing operating pin 30 inwardly until the snap-action switch is operated to open the circuit with the result that the heating element is de-energized. As the thermostatic device cools, it contracts and spring 19 causes lever 14 to pivot in a counter-clockwise direction. This permits lever 31 to shift to the right with the result that pin 30 is shifted outwardly under the tension of spring 24 until the snap-action device shifts past center causing the circuit to close once again. The cycle of operation is thus continuously repeated. The cyclical operation may be adjusted so as to increase the length of the cycle by shifting slide 32 upwardly or to decrease the cycle by shifting slide 32 downwardly. This adjustment also serves to vary the range of operating conditions through which the instrument will cause the controlled element to operate cyclically to maintain the desired conditions in the controlled system. In the instruments illustrated in Figures 1–5, shifting the slide upwardly causes the cyclical operation to occur through a greater range of temperatures or pressures in the controlled system. Conversely, shifting the slide downwardly causes the cyclical operation through a smaller range of temperatures or pressures. Switch 10 is caused to operate cyclically by means of arm or lever 16 which is pivoted to arm 14 at 17. As arm 14 reciprocates back and forth, arm 16 is caused to pivot around the adjusting screw 33 as a fulcrum point. When arm 14 moves in a clockwise direction the upper end of arm 16 shifts away from the switch 10, permitting pin or plunger 11 to project outwardly, with the result that the switch is closed. When arm 14 moves in a counter-clockwise direction the upper end of arm 16 moves toward the switch 10, pressing pin or plunger 11 inwardly and opening the switch.

The fulcrum point of arm 16 is shifted so as to vary the cyclical operation of switch 10 in accordance with variations in the operating conditions in the system controlled by the instrument. Thus, in the first form of my invention the adjusting screw 33 bears against the shiftable anvil or end of thermostatic bellows 34 which operates in response to changes in the ambient temperature. Upon increase in ambient temperature the bellows expands, shifting the fulcrum point to the left as viewed in Fig. 1, with the result that switch 10 is opened for a larger proportion of time during each cycle of operation. Conversely, the thermostat contracts in response to decrease in ambient temperature, shifting the fulcrum point to the right, with the result that switch 10 is closed for a larger proportion of time during each cycle of operation.

The thermostat may be provided with a suitable rotatable adjusting knob 35 having threaded engagement with fixed bracket 36. When the knob is rotated in a clockwise direction it shifts the thermostatic element to the left as viewed in Fig. 1 and when it is rotated in a counter-clockwise direction it shifts this element to the right. Suitable indicia such as numerals 1—10 may be displayed on the face of the knob. Under this arrangement the cycling operation is affected so as to cause the operation of the controlled system for a larger proportion of the time by rotating the knob 35 so as to display a higher number. When the knob is rotated so as to display a lower number, the controlled system operates for a smaller proportion of the time.

The operation of the instrument shown in the first four figures of the drawings is modified and affected by changes in ambient temperature. The instrument may be arranged so that its operation is modified and affected by other operating conditions as for instance pressure. Thus, in Fig. 5 I have shown a portion of an instrument similar in all respects to that shown in the first four figures with the exception that a pressure bellows 38 is substituted for the thermostatic bellows 34. The bellows 38 has a tube 37 leading to the interior thereof and the tube in turn is connected to the controlled system so that the pressure in the system is transmitted to the interior of the bellows. An increase in pressure in the system causes the bellows to expand and the fulcrum point to shift to the left. A decrease in the pressure causes the bellows to contract and the fulcrum point to shift to the right.

In both forms of the device shown in the first five figures of the drawings a switch or valve 10 is provided for controlling the system; and cycling means in turn are provided for causing the cycling operation of the switch or valve within a predetermined range of operating conditions within the system. The timing and also the range of operating conditions through which the cycling operation occurs may be varied by adjusting the slide 32. As previously stated, by shifting the slide 32 upwardly, the cyclical operation occurs through a larger range of temperature or pressures and by shifting it downwardly, the cyclical operation occurs through a smaller range. By rotating knob 35 in one direction, the range can be shifted upwardly and by rotating in the opposite direction the range is shifted downwardly. Above the range, the switch 10 and the controlled system are shut off. Below the range, the switch and the system are operated continuously or full on. The instrument itself automatically compensates for variations in operating conditions within the system by means of a thermostatic element, pressure bellows or other suitable device.

Provision is also made to prevent or stop the cyclical operation of switch 22 when, for any setting of the control knob 35, the condition of the system is somewhat beyond the point at which switch 10 would remain open during normal cycling operation. For example, referring to Fig. 1, when the knob 35 is rotated to display successively lower numbers, the adjusting screw 33 is moved to the left, rotating lever 16 clockwise about pivot 17 to depress pin 11 and open the contacts of switch 10. Lever 16 is provided with an adjusting screw 47 which engages the casing of switch 10 and prevents more than a selected small overtravel motion of lever 16 beyond the position at which the switch 10 is opened. Thus, any further motion to the left of adjusting screw 33 will cause the pivot 17 to also move to the left, and will rotate lever 14 clockwise about pin 15, this depressing the lever 32, and opening switch 22, regardless of the position of the shiftable end of the thermostatic element 12. The adjusting screw 47 can be set so that the overtravel motion of lever 16 as measured at pin 11 is slightly more than the motion at this point which results from the cyclical motion of the lever 14. With this setting the thermostatic element 12 will cycle at all times when the combination of the setting of the knob 35 and the ambient temperature is such that the switch 10 should be closed a part or all of the time, but if the conditions are such that cycling operation would not close the switch 10 for any part of the cycle, then the cycling operation ceases, thus effecting a saving in wear and tear on the mechanical and electrical parts. It will be obvious that this automatic interruption of the cycling operation is equally applicable to other forms of my invention, such as the arrangement illustrated in Fig. 5.

The circuit diagram for either of the first two forms of my instrument is illustrated in Fig. 6. Thus, the switch 10 is connected by a lead 40 to one side of a source of electric current. The other side of the switch is connected by lead 42 to the device 46 which is to be controlled by the instrument. The device 46 is connected by lead 45 to the other side of the source of electric current.

The heating element 13, disposed around thermostatic bellows 12, is connected at one end by lead 43 to lead 40 and at the other end by lead 44 to snap-action switch 22. The other terminal of the snap-action switch is connected by lead 41 to the other side of the source of electric current.

Thus, it will be seen that the periodic operation of snap-action switch 22 causes the periodic energizing and de-energizing of heating element 13. Also, the cyclical operation of the thermostat causes the cyclical operation of switch 10 (at least through the predetermined range of operating conditions) with the result that the controlled device 46 is operated for a predetermined portion of each cycle. The portion of the cycle that the device 46 operates is of course controlled by a number of factors including the adjustment or timing of the cycling device plus the operating conditions in the system itself, which, through the medium of thermostat 34 or pressure bellows 38 varies the cyclical operation of switch 10. It is also affected by the manual setting of the knob 35.

My instrument may be used effectively to control many different types of systems and devices. I have found that it is very effective in controlling a radiant heating system. Conventional heating systems of this type usually use the outdoor temperature, the indoor temperature, or a combination of both for control purposes, and attempt to maintain a constant inside temperature by periodically turning the heating system on and off. In the more elaborate installations throttling control of the radiant heating system is used and occasionally the temperature-sensitive element is designed to be sensitive also to the mean radiant temperature. These installations are so cumbersome and expensive that individual control of residential rooms has not been economically practical.

It is generally recognized that the occupants of a room having a low air temperature can be perfectly comfortable if the mean radiant temperature is sufficient; and also that for every air temperature, within limits, there is a mean radiant temperature which gives comfort, optimum comfort being obtained at air temperatures lower than those conventionally provided, with mean radiant temperatures somewhat higher than the air temperature. I have found that it is possible to take advantage of these conditions and to provide greater comfort as well as improved economy of heating energy by using my new control instrument in conjunction with radiant heating panels, for example, those of the type shown in my co-pending Application No. 687,756, filed on August 1, 1946, now abandoned. Due to the simplicity and low cost of my control instrument, it is feasible to provide individual control of the conditions in each room. When my new control instrument is to be used for this purpose, it is arranged so that thermostatic element 34 is responsive to the air temperature. I adjust the arm 32 as shown in Fig. 1, so that the throttling range of the instrument has a suitable value for the installation, particularly from the standpoint of the size and heat losses of the room on the one hand and the size and maximum output of the heating panels on the other hand. I also provide a proper relationship between the length of time for an average cycle of the instrument and the rating and heat capacity of the panels, so that the time for one cycle is more than one-third and less than one-twentieth of the time required for the panels to attain 90% of their maximum increase in temperature over the ambient temperature. A preferred relationship is about one-fifth, with the cycling time amounting to between one and two minutes, and 90% of the maximum temperature rise of the panels requiring 8 minutes. I have found that under these conditions the control of the heat is extremely rapid for changing requirements, and for any given conditions the panel temperature varies only slightly with the cycle action of the control instrument, despite the fact that the cycling is sufficiently slow to permit a reasonable service for the switches. The rating of the heating element can be relatively low. For example, a rating of 3 watts for the heating element 13 has been found satisfactory to give cycling action within the desired range when used with one conventional bellows type thermostatic element. With a smaller rating the cycling action will be slower and vice-versa.

Depending upon the installation factors discussed above, the throttling range of the control instrument will be adjusted to some value which will usually lie between 5° and 30° F. The best value for this range is not critical and can readily be determined by experiment for each room, so that changes in air temperature, as by opening windows or doors, will cause a change in the amount of heat dissipated by the panel by an amount such that a substantially constant degree of comfort is maintained for occupants with any given setting of the control knob 35. All other things being equal, the throttling range which gives this result will be larger the higher the rating of the panels and the larger their area. Excellent results can be obtained with this control system with panels which cover all of the ceiling of a well-insulated room and which have a maximum temperature rise from normal room temperature of 40° F. It will be recognized that this control system could not perfectly satisfy the requirements unless all interior surfaces of a given room were under the control of my new instrument. However, in rooms having heating panels covering only part of the surface area, as in the ceiling installation mentioned above, my new system of control gives outstanding results and represents a great improvement over any known heating system. For example, in cool weather which still requires some heat for comfort, windows and doors can be thrown open to provide airing for children, without the room feeling cold and with only a moderate cost of electricity in the heating panels.

It will be seen from the foregoing that when my control instrument is used in this manner with a radiant heating system of the panel type, the heat output is varied inversely as a function of the air temperature thus preserving a substantially uniform degree of comfort for the occupants without the necessity of introducing the complications involved in measuring the mean radiant temperature.

My control instrument may also be used to provide proportioning control in an ordinary heating system. Under those circumstances the readings on knob 35 may be replaced with temperature readings representing the air temperature desired in the system. Also the instrument should be adjusted so as to provide for cyclical operation through a very narrow range of air temperature variation, i. e., for a range of approximately one to two degrees. Then assuming the knob 35 set for 70 degrees, when the air temperature is above 70 degrees, the switch 10 and the heating system will be fully shut off. As the temperature approaches 70 degrees cyclical operation of the switch and system commences, but with the switch off for a major portion of each cycle. If the temperature goes lower, the proportion of operating time in each cycle increases until the lower end of the temperature range is reached, when the switch and system will operate continuously. This arrangement generally serves to provide relatively uniform temperature and to prevent the fluctuations inherent in the use of conventional thermostatic controls.

A further modified form of control instrument embodying my invention is shown in Figs. 7 and 8. In this modified form, the valve or switch for controlling the system is indicated generally at 50 and it is pivotally mounted at 51 to the support for the instrument in such a manner that the upper portion thereof may reciprocate back and forth. The switch illustrated is of the snap-action type being generally similar to switches 10 and 22 and is in closed position when the operating pin or plunger 52 projects outwardly.

The cycling means for causing the cyclical operation of the switch comprises a bi-metallic thermostatic element 53 encased within a tubular insulating shield 54 as shown and having an electric heating element 55 disposed therearound in heat exchange relationship. The bi-metallic strip 53 is generally U-shaped in formation having a fixed arm 56 suitably supported by a bracket and a movable arm 57 which shifts towards the left as the element is heated and to the right as it is cooled. The movable arm has an adjusting screw 58 for limiting the return movement of the arm and also adjusting screws 59 and 60 respectively which face in the opposite direction from screw 58.

Screw 59 is engageable with slide 61 supported by bracket 62 so as to impinge against the end of projecting blade 63 on switch 50. When the arm 57 shifts to the left slide 61 and switch 50 are likewise shifted to the left with the result that pin or plunger 52 engages against anvil 64 and is depressed causing the switch to be opened. Anvil 64 is mounted in an opening in arm 65 and is normally held in the indicated position by means of leaf-spring 66 in engagement with the other end of anvil 64. This arrangement permits anvil 64 to shift to the left against the tension of spring 66 in the event of over-travel.

Adjusting screw 60 is engageable with slide 67 supported by bracket 68 so as to be operatively engageable with snap-action switch 69. Slide 67 has an insulating head as shown for engagement with the switch. The snap-action switch may be of the type shown in Fig. 7 or may be of any other desired type as, for instance, that shown in Fig. 3.

The switch shown in Fig. 7 has an actuating blade 70 fixedly mounted at its lower end in an insulating block and connected by rolling spring 71 to contact blade 72 which normally is in engagement with contact blade 73 so as to close the circuit. As slide 67 is shifted to the left the blade 70 moves against the tension of rolling spring 71 until it crosses dead center, at which point contact blade 72 shifts to the right with a snap action so as to open the contacts. Upon the return movement of slide 67 contact blade 70 is permitted to shift to the right by the spring action of blade 70, until the rolling spring again crosses dead center, at which point contact blade 72 will shift to the left with snap-action, closing the circuit.

Adjusting screw 74 is provided in the snap-action switch so as to vary the position of contact blade 73 and thereby vary the length of stroke required to cause the operation of the switch. This, of course, also varies the size of the range of operating conditions in the system, through which the cyclical operation occurs.

The electrical circuits for switches 50 and 69 and electrical heating element 55 are the same as in the first form of my invention and as shown in Fig. 6. Thus, switch 69 serves to control the circuit of heating element 55. Accordingly, when the device is in the position indicated in Fig. 7 snap-action switch 69 is closed with the result that heating element 55 is energized. As thermostat element 53 is heated arm 57 shifts to the left until slide 67 is shifted sufficiently to cause the operation of the snap-action switch and the opening of the contacts. Heating element 55 is then de-energized and as it cools arm 57 shifts to the right until slide 67 has moved sufficiently under the action of blade 70 to permit the switch once again to close through snap-action. The operation is thus repeated cyclically.

The timing of the cycle and also the range of operating conditions through which the cyclical operation will take place can be varied by means of adjusting screw 74. By adjusting screw 74 to move contact blade 73 to the left the length of the cycle is increased whereas by shifting it to the right the length of the cycle is decreased.

As arm 57 shifts to the left it also causes switch 50 to shift to the left until pin 52 is pressed inwardly sufficiently to open the switch. Upon the return movement pin 52 will again project outwardly thereby closing the switch. The cyclical operation of switch 50 of course causes the cyclical operation of the device controlled thereby.

As in the first form of my invention I also provide suitable means for varying the cyclical operation in response to variation in operating conditions in a controlled system. This may take the form of a thermostatic device or a pressure responsive device.

In Fig. 7 I have shown a thermostatic bellows 75 suitably mounted so that the left end thereof, shifts to the left as the bellows expands and to the right as the bellows contracts. Arm 65 is pivotally mounted as shown at 76 and the lower end thereof is provided with an adjusting screw 77 which engages the end of thermostat bellows 75. Thus, as the temperature rises the bellows expands and shifts to the left causing the arm 65 to pivot in a clockwise direction. When this takes place the contacts of switch 50 will be open for a larger proportion of each cycle. Conversely when the temperature decreases bellows 75 contracts and arm 65 is caused to pivot in a counter-clockwise direction under the action of spring 78. The result will be that switch 50 will be closed for a larger proportion of each cycle of operation.

The thermostatic element shown in Fig. 7 may likewise be provided with a rotatable adjusting knob 79 having threaded engagement with fixed bracket 80. When the knob is rotated in a clockwise direction it shifts the thermostatic element to the left, as viewed in Fig. 1, and when it is rotated in a counter-clockwise direction it shifts the element to the right. Suitable indicia may likewise be displayed on the face of the knob.

The modified form of instrument shown in Figs. 7 and 8 may be used in the same manner as described in connection with the first form of my invention.

In the several forms of my invention described so far, the elements 34, 38 and 75 are responsive to conditions in the controlled system. They may of course be elements which are not responsive to conditions in the system and merely be subject to manual adjustment in which event the control instrument serves as a percentage timer whose operation is controlled by knob 35. In this form the invention is particularly applicable for use in manually controlling the heat input to small electric furnaces and other heating devices.

From the foregoing it will be seen that I have provided an improved control instrument of the throttling type wherein the controlled system can be readily controlled to produce the desired predetermined uniform results which can be varied. It will also be seen that my instrument can provide for throttling control or cyclical operation within a predetermined range of operating conditions and that the range within which the throttling control takes place may be readily varied.

As will be recognized by anyone skilled in the art, I have also provided a highly-sensitive low-cost control instrument of simple design which is able to operate with great sensitivity and without the use of relays or other additional equipment, valves and switches capable of controlling large amounts of energy.

It will also be seen that I have provided an improved control instrument for controlling radiant heating systems of the panel type.

Modifications may of course be made in the illustrated and described embodiment of my invention without departing from the invention as set forth in the accompanying claims.

I claim:

1. A control instrument comprising: a control switch; an operating member in operative relation with the control switch and mounted for shift movement so as to cause the operation of the switch when in one position and the release of the switch when in another position; means to cause positive movement of the operating member within predetermined limits to thereby cause the cyclical operation and release of the switch; and means, responsive to changes in ambient conditions, in operative relation with the operating member to vary the position of the operating member and consequently the cyclical operation of the switch in response to changes in ambient conditions.

2. A control instrument comprising: a control switch; an operating member in operative relation with the control switch and mounted for shift movement so as to cause the operation of the switch when in one position and the release of the switch when in another position; means to cause positive movement of the operating member within predetermined limits to thereby cause the cyclical operation and release of the switch; and thermostatic means in operative relation to the operating member so as to vary the position of the operating member and consequently the cyclical operation of the switch in response to changes in ambient temperature.

3. A control instrument comprising: a control switch; an operating member in operative relation with the control switch and mounted for shift movement so as to cause the operation of the switch when in one position and the release of the switch when in another position; means to cause positive movement of the operating member within predetermined limits to thereby cause the cyclical operation and release of the switch; manual adjusting means for varying the position of the operating member so as to thereby vary the cyclical operation of the switch; and means, responsive to changes in ambient conditions, in operative relation with the operating member to vary the position of the operating member and consequently the cyclical operation of the switch in response to changes in ambient conditions.

4. A control instrument comprising: a control switch; an operating member in operative relation with the control switch and mounted for shift movement so as to cause the operation of the control switch when in one position and the release of the control switch when in another position; means including a thermostatic member in operative relation with the operating member, a heating element for the thermostatic member and a snap-action switch for controlling the heating element in operative relation with the operating member for causing the positive movement of the operating member within predetermined limits to thereby cause the cyclical operation of the control switch; and means responsive to changes in ambient conditions in operative relation to the operating member to vary the position of the operating member and consequently the cyclical operation of the control switch in response to changes in ambient conditions.

5. A control instrument comprising: a control switch; an operating member in operative relation with the control switch and mounted for shift movement so as to cause the operation of the switch when in one position and the release of the switch when in another position; means including a thermostatic member in operative relation with the operating member, a heating element for the thermostatic member, a snap-action switch for controlling the heating element and an adjustable operating lever for the snap-action switch in operative relation with the operating member for causing the positive movement of the operating member within predetermined limits to thereby cause the cyclical operation of the control switch; and means responsive to changes in ambient conditions in operative relation to the operating member to vary the position of the operating member and consequently the cyclical operation of the switch in response to changes in ambient conditions.

6. A control instrument as set forth in claim 5 in which the last named means is arranged to operate within a predetermined range of ambient conditions and said means, operating member, and operating lever are arranged to hold said snap-action switch in open position to interrupt the cyclical operation when the ambient conditions are outside of the predetermined range.

7. A control instrument comprising: a control switch; means including a pair of pivotally connected levers mounted for shift movement with one lever in operative relation with the control switch so as to cause the operation of the switch when in one position and release of the switch when in another position; means including a thermostatic member in operative relation with the other of said levers, a heating element for the thermostatic member and a snap-action switch for controlling the heating element in operative relation with the last mentioned lever for causing the positive movement of both mentioned levers within predetermined limits to thereby cause the cyclical operation of the control switch; and means responsive to changes in ambient conditions in operative relation to the operating means to vary the position of the levers and consequently the cyclical operation of the control switch in response to changes in ambient conditions.

8. A control instrument comprising a control switch, a temperature sensitive member in variable operable relation to said control switch, a shiftable member controlling said variable relation, and means to provide positive cyclical movement of said shiftable member between predetermined limits.

DUNCAN B. COX.

REFERENCES CITED

The following references are of record in the file of this patent:

UNITED STATES PATENTS

| Number | Name | Date |
|---|---|---|
| 260,651 | Brush | July 4, 1882 |
| 1,859,099 | Lewis et al. | May 17, 1932 |
| 1,916,409 | Bourgeois et al. | July 4, 1933 |
| 2,033,410 | Dezotell | Mar. 10, 1936 |
| 2,052,537 | Shivers | Aug. 25, 1936 |
| 2,073,286 | Raney | Mar. 9, 1937 |
| 2,111,816 | Shaw | Mar. 22, 1938 |
| 2,116,389 | Fiene | May 3, 1938 |
| 2,181,606 | Parks | Nov. 28, 1939 |
| 2,216,809 | Derby | Oct. 8, 1940 |
| 2,228,515 | Foulds | Jan. 14, 1941 |
| 2,238,219 | Fineran | Apr. 15, 1941 |
| 2,275,928 | Topham | Mar. 10, 1942 |
| 2,285,913 | Derrah | June 9, 1942 |